UNITED STATES PATENT OFFICE.

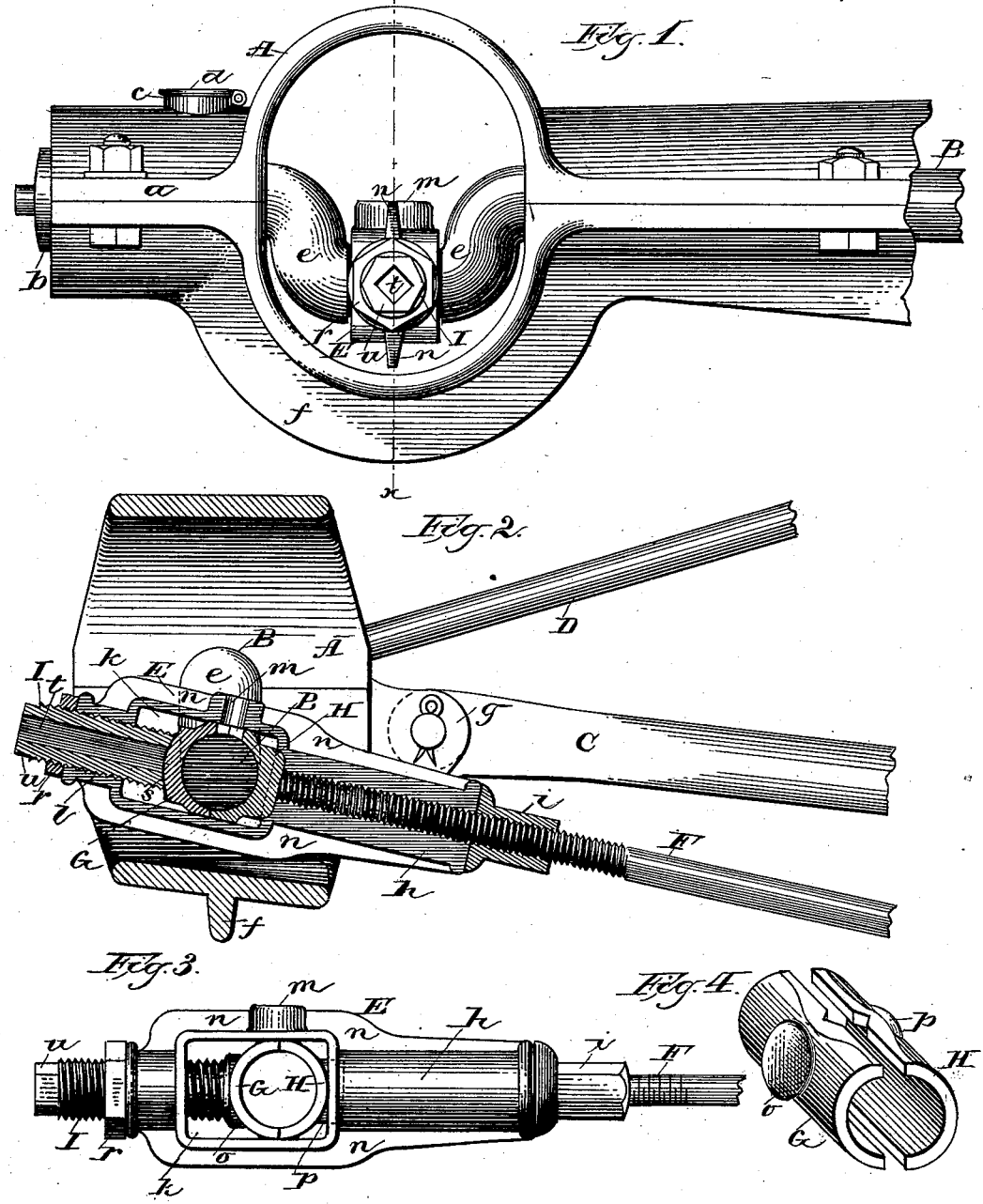

CHARLES MARTINCOURT, OF MILWAUKEE, WISCONSIN, ASSIGNOR TO THE MILWAUKEE HARVESTER COMPANY, OF SAME PLACE.

PITMAN-CONNECTION FOR MOWERS.

SPECIFICATION forming part of Letters Patent No. 373,781, dated November 22, 1887.

Application filed October 6, 1885. Serial No. 179,126. (No model.)

*To all whom it may concern:*

Be it known that I, CHARLES MARTINCOURT, of Milwaukee, in the county of Milwaukee, and in the State of Wisconsin, have invented certain new and useful Improvements in Pitman-Connections for Mowers; and I do hereby declare that the following is a full, clear, and exact description thereof.

My invention relates more particularly to mowers and analogous implements; and it consists in the peculiar construction of the pitman-head and the manner of attaching it to the drive-shaft, as will be hereinafter described.

In the drawings, Figure 1 represents a side elevation of my invention; Fig. 2, a transverse section on line $x\,x$, Fig. 1; Fig. 3, a top plan view of the pitman-head, and Fig. 4 a detail perspective view of the shaft-bushing.

A represents a portion of the housing which protects the smaller mechanism of a mower or analogous implement, this portion of said housing being composed of two sections arch-shaped near their forward ends and united by suitable bolts and nuts, as illustrated by Fig. 1. The sections, when united, form at their forward ends a bearing, $a$, for the end $b$ of a drive-shaft, B, and the upper one of said sections is provided with a port, $c$, through which latter oil is supplied to lubricate the shaft in its bearings. This oil-port $c$ has a hinged cover, $d$, to prevent the entrance of grit or other coarse particles. The lower section of the housing is formed with a longitudinal strengthening-web, $f$, and a lug, $g$, to which latter is pivotally connected the shoe-rod C, and a stay-rod, D, is also connected to the housing and a supporting part of the machine. (Not shown.) The pitman-head E is formed with a cylindrical rear portion, $h$, screw-threaded upon its interior to receive the correspondingly-screw-threaded end of the pitman-rod F, said pitman-rod being provided with a jam-nut, $i$.

Near the forward end of the pitman-head E is a rectangular opening, $k$, terminating in an internally-screw-threaded socket, $l$, said rectangular opening being also provided with an oil-port, $m$, these latter parts and the internally-screw-threaded rear portion, $h$, of the pitman-head being integrally formed with strengthening-webs $n\,n$. The rectangular opening of the pitman-head is designed to receive the bushing for the crank $e$ of the drive-shaft B, said bushing being composed of two semi-cylindrical sections, G H, preferably of Babbitt metal. These bushing-sections are slightly flattened upon their upper and lower faces so as to come flush with and against the inner sides of the rectangular opening in the pitman-head when in position for use, said bushing-sections being cut out in the center of their upper flattened faces, so that when brought together to incase the crank of the drive-shaft these cut-out portions will form an opening to register with the oil-port $m$ in the rectangular opening to permit the ready application of lubricant to said shaft.

Upon the outer sides of the bushing-sections G H, and formed integral therewith, are projections $o\,p$, the one, $o$, being circular in form and convex upon its face, while the one, $p$, is of a rectangular shape and plain surfaced on the face, though for the purpose of securing a neater joint its edges may be rounded off.

Designed to engage the internally-screw-threaded socket $l$ of the pitman-head E is a set-screw, I, provided with a jam-nut, $r$. This set-screw has its inner end concaved, as shown at $s$, and when said screw is adjusted and in operative position this concaved end will bear against the projection $o$ on the bushing-section G. It will be noticed that the set-screw I is formed with a square opening, $t$, which extends throughout its entire length, said screw being also formed with a square head, $u$. This construction of the set-screw not only serves to cheapen its manufacture by effecting a saving in material, but also permits of its being adjusted with either an ordinary open or socket wrench, as may be most convenient.

The bushing-section H is set in the rectangular opening of the pitman-head, so that the projection $p$ on the former will fit snugly in a socket formed in the forward end of the cylindrical part $h$ of the latter, as shown in Fig. 2. The rectangular portion of the pitman-head is now placed upon the crank of the shaft B, and the bushing-section G introduced in said rectangular portion of the pitman-head. The hollow set-screw I in the socket $l$ is now adjusted so that its concaved end $s$ will bear against the convex face of the projection $o$ on the outer face of said bushing-section G, and thus the latter is forced up against the crank of the drive-shaft and comes in contact with the opposite bushing-section, H. The jam-nut $r$ is now screwed up and the several parts held firmly in position. The pitman-rod F is screwed into the cylindrical portion $h$ of the pitman-head, said cylindrical portion being internally screw-threaded throughout its bore so that the pitman-rod can be readily adjusted as to length. The jam-nut $i$ bears against the rear of said pitman-head to retain the rod in its adjusted position. The pitman head and rod being adjusted with relation to the drive-shaft, the housing-sections are joined together about the latter, and the entire adjustment and connection of the several parts thus completed.

Having now fully described my invention, what I claim as new, and desire to secure by Letters Patent, is—

1. A pitman-head consisting of a rear cylindrical portion screw-threaded upon the interior throughout its entire length, an open rectangular forward portion formed with an oil-port and terminating in an internally-screw-threaded socket, a detachable bushing consisting of two semi-cylindrical sections, and a set-screw having a squared opening throughout its length and arranged to operate in said internally-screw-threaded socket, substantially as and for the purpose specified.

2. A pitman-head having a rear cylindrical portion screw-threaded upon its interior and formed with a socket at its forward end, a rectangular opening provided with an oil-port and terminating with an internally-screw-threaded socket, a strengthening-web formed integral with said parts, a set-screw concaved upon its end and arranged to operate within the screw-threaded socket, said set-screw being provided with a jam-nut, and constructed with a square head and a squared opening, which latter extends its entire length, and a removable bushing composed of two semi-cylindrical sections flattened upon their upper and lower faces and cut out in the central portion of said upper faces, one of these bushing-sections constructed with an outward projection having a convex face and the other with a similar projection having a plain face, substantially as and for the purpose set forth.

In testimony that I claim the foregoing I have hereunto set my hand, at Milwaukee, in the county of Milwaukee and State of Wisconsin, in the presence of two witnesses.

CHARLES MARTINCOURT.

Witnesses:
S. S. STOUT,
MAURICE F. FREAR.